US011310335B2

(12) United States Patent
Adams et al.

(10) Patent No.: US 11,310,335 B2
(45) Date of Patent: Apr. 19, 2022

(54) FUNCTION AS A SERVICE GATEWAY

(71) Applicant: JPMorgan Chase Bank, N.A., New York, NY (US)

(72) Inventors: Duncan Adams, Keysoe (GB); Alex Hayzelden, Chigwell (GB); Tanmay Madan, London (GB); Callum Watson, Gourock (GB); Richard Francois, Frisco, TX (US); Dominic Dumrauf, Loam pit Vale (GB); Vaidyalingam Ramalingam, Bournemouth (GB); Stephen Flaherty, Clarkston (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 58 days.

(21) Appl. No.: 16/409,353

(22) Filed: May 10, 2019

(65) Prior Publication Data
US 2019/0349447 A1 Nov. 14, 2019

Related U.S. Application Data

(60) Provisional application No. 62/670,243, filed on May 11, 2018.

(51) Int. Cl.
*H04L 29/08* (2006.01)
*H04L 29/06* (2006.01)
(Continued)

(52) U.S. Cl.
CPC .......... *H04L 67/2861* (2013.01); *G06F 9/547* (2013.01); *H04L 67/2838* (2013.01);
(Continued)

(58) Field of Classification Search
CPC ............. H04L 67/2861; H04L 67/2838; H04L 67/2895; H04L 67/36; H04L 67/42;
(Continued)

(56) References Cited

U.S. PATENT DOCUMENTS 8,626,822 B2 * 1/2014 Hiscock ................ H04L 67/327 709/203
10,671,360 B1 * 6/2020 Todd .................... G06F 11/3466
(Continued)

OTHER PUBLICATIONS

Caulfield et al., "A Cloud-Scale Acceleration Architecture," In: The 49th Annual IEEE/ACM International Symposium on Microarchitecture, Oct. 15, 2016 (Oct. 15, 2016) Retrieved on Jul. 6, 2019 (Jul. 6, 2019) from https://www.cl.cam.ac.uk/teaching/0910/R02/papers/Cloud-Scale-Acceleration-Architecture.pdf, entire document.
(Continued)

*Primary Examiner* — Uzma Alam
(74) *Attorney, Agent, or Firm* — Greenberg Traurig LLP (57) ABSTRACT

Embodiments disclosed herein provide for systems and methods of efficiently scheduling the execution of user-provided functions on available serverless computing vendor platforms using a Function as a Service ("FaaS") gateway, wherein the FaaS gateway provides the function code to one of the available serverless computing vendor platforms based on service parameters provided by each platform.

18 Claims, 5 Drawing Sheets

(51) Int. Cl.
  *G06F 9/54* (2006.01)
  *H04L 67/59* (2022.01)
  *H04L 67/567* (2022.01)
  *H04L 67/2895* (2022.01)
  *H04L 67/75* (2022.01)
  *H04L 67/01* (2022.01)
  *H04L 67/60* (2022.01)

(52) U.S. Cl.
  CPC .......... *H04L 67/2895* (2013.01); *H04L 67/32* (2013.01); *H04L 67/36* (2013.01); *H04L 67/42* (2013.01)

(58) Field of Classification Search
  CPC ..... H04L 67/32; H04L 63/0428; H04L 67/10; H04L 67/02; G06F 9/547; G06F 9/5027
  See application file for complete search history.

(56) References Cited

U.S. PATENT DOCUMENTS

| | | | |
|---|---|---|---|
| 2006/0165105 A1* | 7/2006 | Shenfield | H04L 67/2838 370/401 |
| 2006/0235978 A1* | 10/2006 | Bibr | H04L 67/2823 709/227 |
| 2011/0154353 A1* | 6/2011 | Theroux | G06F 9/5038 718/104 |
| 2011/0173038 A1* | 7/2011 | Moon | G06Q 10/0631 705/7.12 |
| 2012/0029710 A1* | 2/2012 | Dodderi | H02J 13/0079 700/286 |
| 2013/0067090 A1 | 3/2013 | Batrouni et al. | |
| 2013/0080509 A1 | 3/2013 | Wang | |
| 2014/0278808 A1* | 9/2014 | Iyoob | G06Q 30/0206 705/7.35 |
| 2014/0317166 A1 | 10/2014 | Iyoob et al. | |
| 2016/0019636 A1 | 1/2016 | Adapalli et al. | |
| 2016/0065417 A1* | 3/2016 | Sapuram | H04L 47/70 709/223 |
| 2019/0004871 A1* | 1/2019 | Sukhomlinov | G06F 9/541 |
| 2019/0012218 A1* | 1/2019 | Rimac | G06F 9/542 |
| 2019/0028552 A1* | 1/2019 | Johnson, II | H04L 67/02 |

OTHER PUBLICATIONS

International Searching Authority, PCT International Search Report and Written Opinion, International Application No. PCT/US2019/031822, dated Jul. 26, 2019, pp. 1-9.

Extended European Search Report dated Dec. 23, 2021, from corresponding European Patent Application No. 19800645.4.

Foued, Jrad; "A Service Broker for Intercloud Computing", Jul. 10, 2014, XP055870408.

* cited by examiner

FUNCTION AS A SERVICE GATEWAY

CROSS-REFERENCE TO RELATED APPLICATION

This application claims the benefit of the filing date of, and incorporates by reference thereto in its entirety, U.S. Provisional Patent Application Ser. No. 62/670,243, filed on May 11, 2018.

FIELD OF THE INVENTION

The present disclosure generally relates to serverless computing, and more particularly to systems and methods for implementing a Function as a Service ("FaaS") gateway.

BACKGROUND

Serverless computing refers to a cloud computing model in which developers are able to run code on the cloud service vendor's servers in an as-needed basis, thereby allowing the developers to eschew the need for their own infrastructure. For example, developers can run code associated with particular application functions. As such, the cloud service vendor's servers can be utilized to provide functions as a service ("FaaS"). With FaaS, computing consumed by the code is paid for on a pay-as-you-go basis, with there being no charge when the code is not running. Thus, the model is suitable for highly responsive customer-facing websites, where visitors tend to be sensitive towards latency issues. Most, if not all, major cloud service vendors provide some level of support for serverless computing. Example products include AWS Lambda, Google Cloud Functions, Microsoft Azure Functions, IBM/Apache OpenWhisk, and Oracle Cloud Fn.

With such a variety of options for serverless computing, the "right" vendor is currently chosen depending on a number of factors such as cost, performance, and proximity of data and functional endpoints. In particular, the developers choose the "right" vendor by manually comparing the various vendor offering (e.g., price and capabilities) to each other. However, the "right" vendor for running a particular function could change at a given point in time based on external, vendor-managed factors. In this regard, a manual process for selecting a vendor may not be able to take into consideration such real-time changes. Further, even without taking real-time changes into consideration, the manual process for identifying and selecting the "right" vendor is generally considered a non-trivial and time-consuming task. In addition, maintaining the "right" vendor for the serverless computing resources also requires a time-consuming manual process including regular review and revision. As such, the current systems cannot perform real-time routing between the different vendors.

Accordingly, there is a need for a system and method to efficiently schedule the execution of user-provided functions on available serverless computing vendor platforms.

SUMMARY

One aspect of the present disclosure relates to providing systems and methods for efficiently scheduling the execution of user-provided functions on available serverless computing vendor platforms.

According to an embodiment, a system for scheduling execution of function code between a plurality of cloud service platforms may include: (i) a gateway, wherein the gateway includes at least one connector configured to receive incoming function code; (ii) a cloud service platform data aggregator, wherein the cloud service platform data aggregator is configured to receive service parameters from each of the plurality of cloud service platforms; and (iii) a metric scheduler, wherein the metric scheduler defines policies for routing the incoming function code to at least one of the plurality of cloud service platforms, wherein the gateway is configured to provide the incoming function code to one of the plurality of cloud service platforms for execution based on (i) the service parameters provided by each of the plurality of cloud service platforms and (ii) the policies provided by the metric scheduler.

According to an embodiment, a method for scheduling execution of function code between a plurality of cloud service platforms may include: receiving, with a gateway, incoming function code; receiving, with a cloud service platform data aggregator, service parameters from each of the plurality of cloud service platforms; and routing, with the gateway, the incoming function code to one of the plurality of cloud service platforms for execution based on the service parameters provided by each of the plurality of cloud service platforms.

According to an embodiment, a system for scheduling execution of function code between a plurality of cloud service platforms may include: (i) a first computing device, wherein the first computing device is configured to receive incoming function code; and a (ii) second computing device, wherein the second computing device is configured to receive service parameters from each of the plurality of cloud service platforms, wherein the first computing device is configured to provide the incoming function code to one of the plurality of cloud service platforms for execution based on the service parameters provided by each of the plurality of cloud service platforms.

In particular, embodiments disclosed herein are directed to a FaaS gateway that may schedule the execution of user-provided functions on available vendor platforms.

The FaaS gateway may provide the following technical advantages: the ability to perform the cross comparison of vendor computing resources, vendor costs, known resource requirements of the application, and vendor quality of service in an automated manner; the ability to determine the "right" vendor for the serverless computing resources based on automated review and revision (of policies and rules); the ability to perform intelligent routing based on business defined metrics; providing intelligent routing, including the ability to provide feedback (through the user interface) and make recommendations based on historical user activities; the ability to revert to other dedicated infrastructure if the application is deemed unsuitable for FaaS; and the ability to provide a single point of entry to external serverless computing resources.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
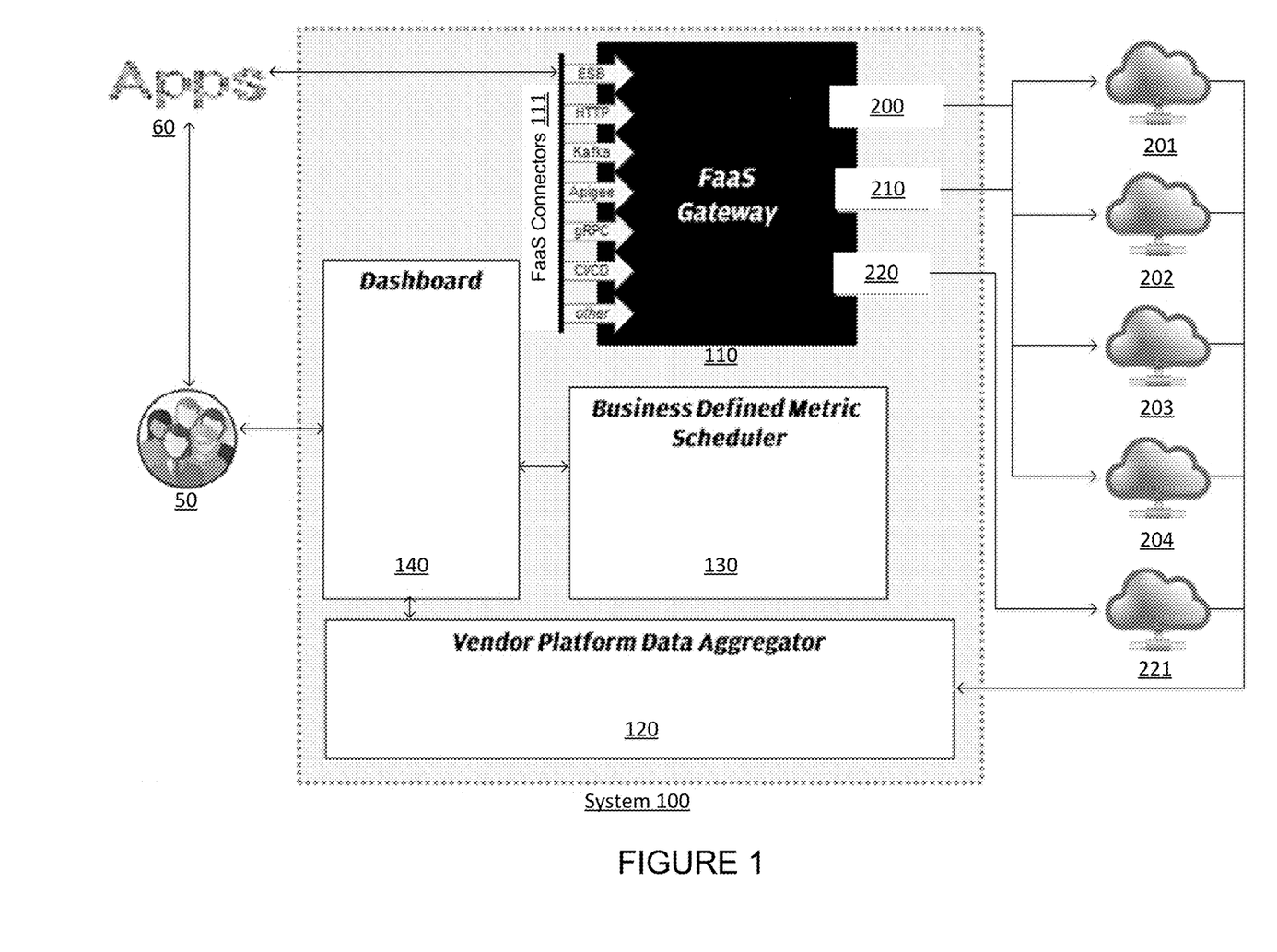
FIG. 1 illustrates a system for scheduling execution of function code between a plurality of cloud service platforms according to an embodiment of the present invention.

FIG. 1 illustrates a system for scheduling execution of function code between a plurality of cloud service platforms according to an embodiment of the present invention. As depicted in the figure, a system 100 includes (1) a FaaS gateway 110, (2) a vendor platform data aggregator 120; (3) a business defined metric scheduler 130; and (4) a dashboard 140. According to an embodiment, the FaaS gateway 110 may also include one or more connectors 111. The one or more connectors 111 may be utilized to consume various distinct protocols or inputs into the FaaS gateway 110. In particular, each connector 111 may be associated with a distinct protocol or input. For example, one of the connectors 111 may be associated with the enterprise service bus (ESB) protocol. Similarly, the other connectors 111 may also be associated with a corresponding protocol or input, e.g., HyperText Transfer Protocol (HTTP), transmission control protocol (TCP) communication protocols (e.g., Kafka, Apigee, etc.), remote procedure calls (e.g., gRPC), messaging protocols (e.g., Message Queuing Telemetry Transport (MQTT)), continuous integration/continuous delivery (CI/CD), etc. According to an embodiment, a particular connector 111 may be chosen based on the application 60 in communication with the FaaS gateway 110. Specifically, one or more connectors 111 may be defined for each application 60 as the application 60 is being registered/onboarded on to the FaaS gateway 110. In addition, the following features may also be configured during the registration process: (i) importing or creating new functions, (ii) mapping particular connector 111 input content to function call elements, (iii) queueing or scheduling function calls (and for what reasons, e.g., price point), (iv) selecting input content or output results to be cached, (v) configuring which calling mechanism to use (e.g., 200 or 220), (vi) configuring whether function calls are synchronous or asynchronous, and (vii) selecting a cloud service vendor from target cloud service vendor(s). Further, according to an embodiment, registering the application 60 to the FaaS gateway 110 provides the ability for many of the above features of the FaaS gateway 110 to be self-serviced via an API 210 or via a graphical user interface (UI) associated with the dashboard 140. Connector 111 also provides an interface for the dashboard 140. According to an embodiment, the UI associated with the dashboard 140 may be utilized to provide the configuration, management, and runtime portal to all aspects of the FaaS gateway 110 and its supporting components.

The particular connectors 111 associated with the application 60 may be utilized to receive and consume input from the application 60. Further, after the particular connector 111 receives and consumes the input from the application 60, the FaaS gateway 110 may then trigger a function call to one of the available cloud service vendors' serverless computing services. In other words, the FaaS gateway 110 may call a desired function (or predefined workflow of functions) corresponding to the input at the connector 111. Further, the desired function (or predefined workflow of functions) may be called via a first calling mechanism 200 associated with proprietary serverless computing services (e.g., AWS Lambda, Google Cloud Functions, Microsoft Azure Functions, IBM/Apache OpenWhisk, Oracle Cloud Fn) or a second calling mechanism 220 associated with open source serverless computing services (e.g., Kubernetes, Docker). For example, as depicted in the figure, the first calling mechanism 200 may be associated with serverless computing services 201 to 204, while the second calling mechanism 220 may be associated with serverless computing services 221.

Further, according to an embodiment, the aggregator 120 may be responsible for the collection of service parameters. Service parameters may include telemetry, pricing, service levels, compliance (e.g., PCI, SOC2), security features (e.g., encryption) that a FaaS function (or the FaaS service itself) has dependencies on, resource availability, performance, as well as other sources of interest provided by the available cloud service vendors' serverless computing services 201, 202, 203, 204, and 221. According to an embodiment, the telemetry may include operational data, financial data, etc. The service parameters may include any parameter known in the art that could affect the decision of whether to utilize a particular cloud service vendors' serverless computing services.

The metric scheduler 130 may provide the ability for developers 50 to create policies (e.g., cost policies, processing policies, etc.) that (i) determine which cloud service vendors to call or (ii) support logical flow control. According to an embodiment, the rules that form the basis of the policies may be created and enforced independently of those policies. For example, if a particular provider goes offline, a rule can be created to dynamically route to an alternative and suitable serverless computing service, overriding policies that may be in place. In addition, the FaaS gateway 110 may also provide rules and/or definitions for the following: (i) content-based routing, (ii) bi-directional mapping of data elements and/or for the enrichment of data, and (iii) data elements to be preserved in a data cache service for state management purposes, etc. A definition may be as simple as substituting one value with another, such as 'Texas', for 'TX'. A rule would apply conditional logic, such as "if value=yes'" then call function func1( ) and "if value=no" then call function func2( ). Further, the information or values that transverse the FaaS gateway 110 can be marked to cache that information. According to an embodiment, the definition, rules, and cache requirements may be defined during the registration/onboarding of the application 60, for each inbound transaction.

Further, as regards to the logical flow controls, the FaaS gateway 110 may use an application "flow" designer associated with the dashboard 140's UI to construct logical flows for a function call order. For example, a function call into the FaaS gateway 110 for 'place order' may result in many FaaS calls, such as validate address, fraud order protection, place order, and send confirmation email. The FaaS gateway 110 may need to cache information or make flow decisions based on the outcome of each of these ordered function calls. Some of these FaaS calls may be defined to run in parallel or sequenced. This is configured as part of the transaction flow—in this case, one call into the FaaS gateway 110 results in four FaaS calls.

Further, according to an embodiment, the FaaS gateway 110 may be configured to also receive data from external data stores such as corporate Configuration Management Database (CMDB), big data (e.g., Elasticsearch, Logstash, and Kibana (ELK)), etc. Accordingly, by hosting and/or leveraging such data stores, the FaaS gateway 110 is able to enrich (i) decision points on where to run transactions/FaaS calls and (ii) data payloads to send to a serverless computing service (or to return to the FaaS gateway 110 caller).

Further, routing between the serverless computing services may be based on a variety of vendor parameters that may be updated regularly, including pricing (e.g., cost calculated per GB-s or million executions), supported languages, maximum execution time per request, concurrent executions, etc. As an illustrative, non-limiting example, after a developer 50 submits a particular function code to the FaaS gateway 110 for inspection, the FaaS gateway 110 implements a routing algorithm in order to determine, for each of the available vendors, (i) the complexity of the function, (ii) resources and time needed to execute it, (iii) the language used, and (iv) price offered. Based on this, the FaaS gateway 110 may suggest that the function needs 512 MB memory to be allocated with 3 seconds of execution time. The below is an exemplary calculation of the costs across different vendors assuming 5 million requests are made in a month:

Serverless computing service 201=$136.95
Serverless computing service 202=$120.70
Serverless computing service 203=$119.16
Serverless computing service 204=$114.40

As depicted above, the serverless computing service 204 offers the lowest cost. Assuming cost is the only and/or most important factor, the FaaS gateway 110 will use service 204 to execute the code. In general, the FaaS gateway 110 compares the vendors by: (i) accessing a set of dynamic data points that are frequently updated by several mechanisms to ensure that near real-time data is available and (ii) using the accessed set of data points in a static set of metrics from which a final score is derived; here, metrics may include, but are not limited to, price, capacity, or historic data.

In one embodiment, machine learning, artificial intelligence, and/or feedback may be used to route a function to a cloud service vendor. For example, based on prior selections, applications of rules, etc., the FaaS gateway 110 may select a cloud service vendor for routing the function. As described above, definitions or rules or policies using aggregated data will dictate routing, which in some cases will be dynamic, e.g., price fluctuations based on cloud provider available capacity.

In one embodiment, the FaaS gateway may identify discounts (e.g., volume discounts) available to the organization, and may factor in a likelihood of receiving those discounts over a time period in determining cost information for a cloud provider.

According to an embodiment, the system 100 may include one or more computing devices, such as servers and personal computing devices. The system 100 may also include one or more networks that connect the various computing devices. For example, the system 100 as well as the applications 60 may be implemented in a single computing device. In another embodiment, the applications 60, metric scheduler 130, and the dashboard 140 may be associated with one computing device, while the FaaS gateway 110 and the aggregator 120 may be associated with one or more other computing devices. Further, according to an embodiment, each of the serverless computing services 201 to 204 and 221 may be implemented with one or more computing devices.

Figure 2:
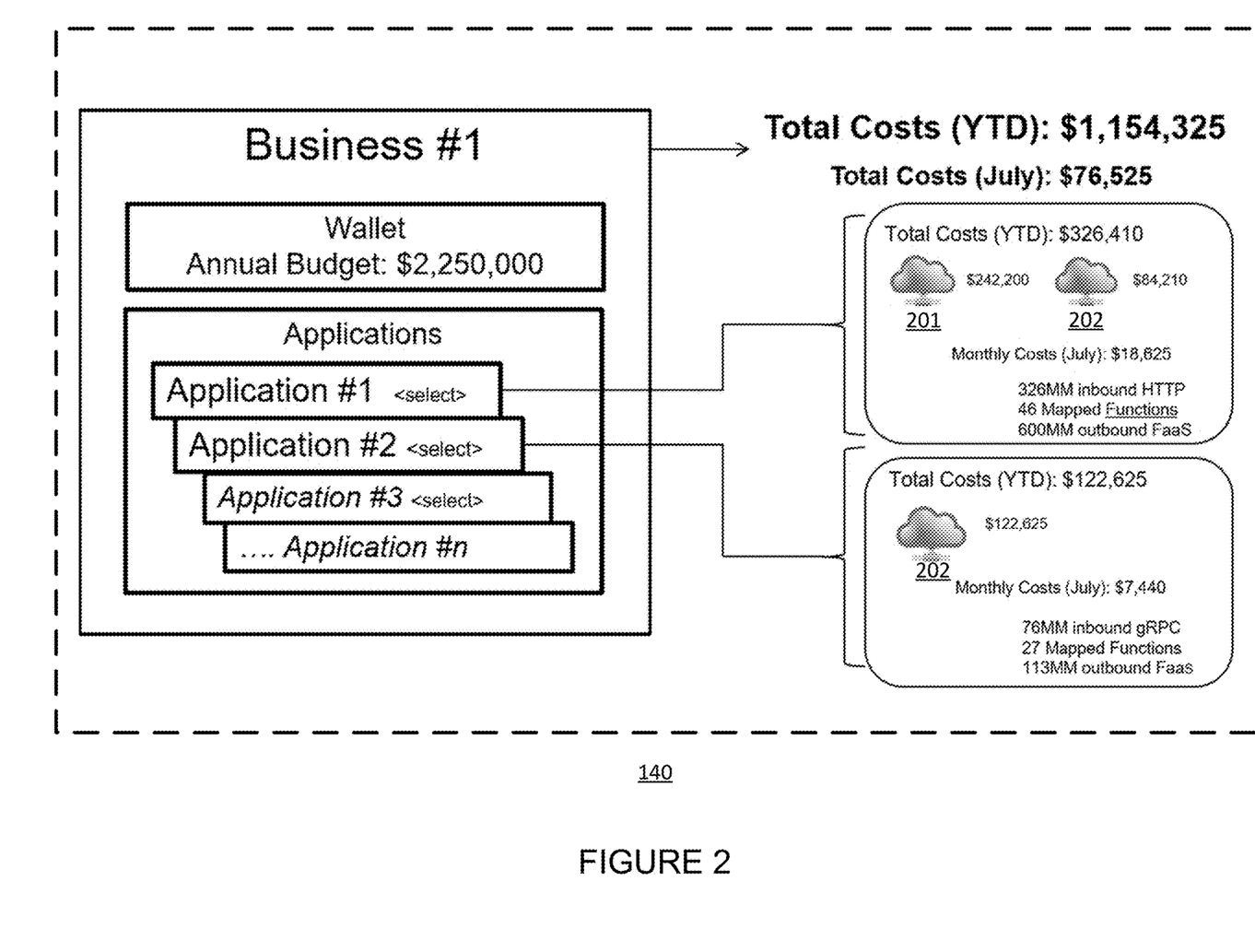
FIG. 2 illustrates an example embodiment of the user interface associated with the dashboard in FIG. 1.

FIG. 2 illustrates an example embodiment of the user interface associated with the dashboard 140. As depicted in the figure, each of the applications of Business #1 (e.g., Application #1, #2, etc.) include associated costs, with the bases for the charges (e.g., inbound HTTP, mapped functions, outbound FaaS, etc.) also being identified.

Figure 3:
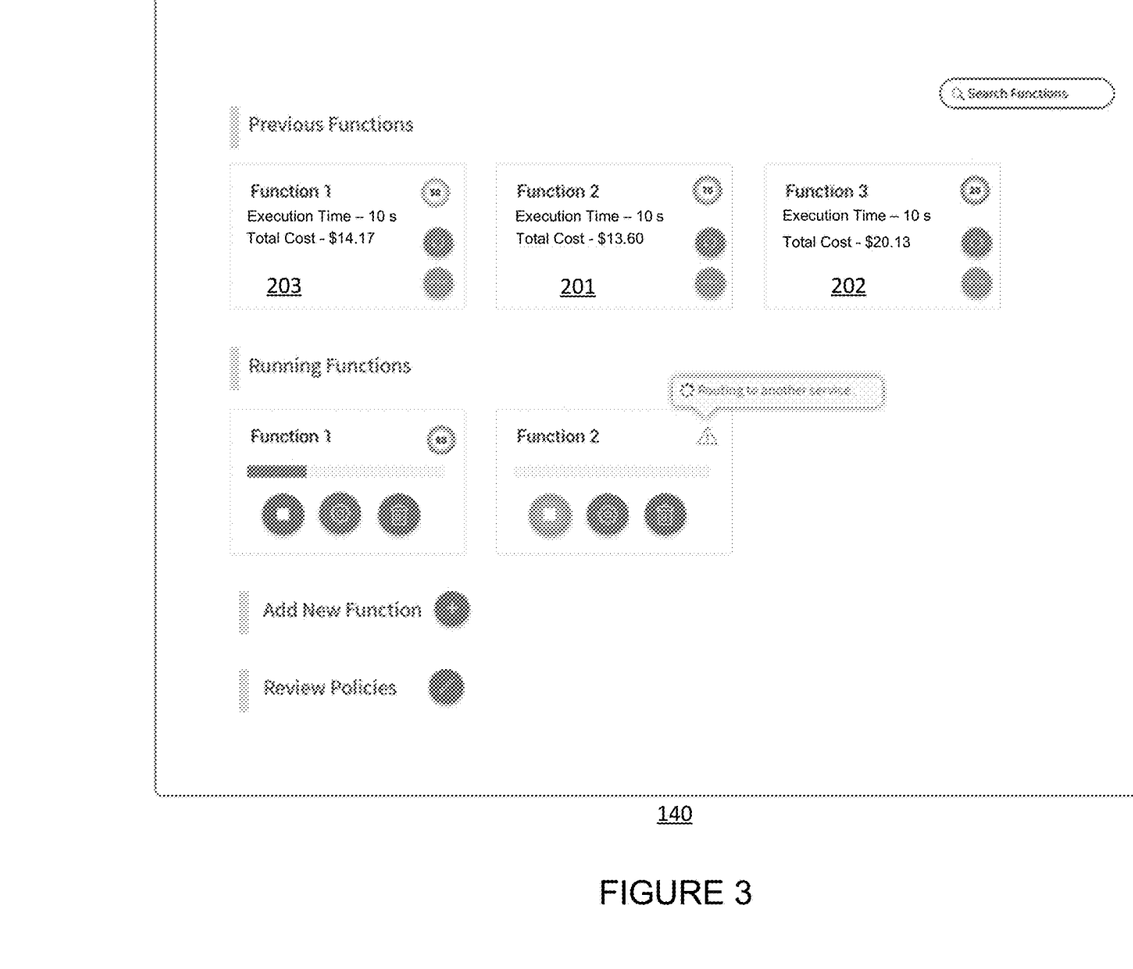
FIG. 3 illustrates another example embodiment of the user interface associated with the dashboard in FIG. 1.

FIG. 3 illustrates another example embodiment of the user interface associated with the dashboard in FIG. 1. In particular, with the UI, a user 50 can visualize, modify, and add functions to the FaaS gateway 110 associated with the application 60. For example, for each function ("Previous Functions"), it may identify (i) the best fit, (ii) the target platform selected, and (iii) the total accumulated cost. It may further allow the user to adjust the configuration/settings, report the time to run per iteration, and permit the execution of a test. For "Running Functions," the interface may indicate intelligent re-routing (e.g., to support resiliency), and may show the execution progress of the function. Other capabilities, including "Add New Function" (e.g., ability to create new application functions through the UI) and "Review Policies" (e.g., ability to review policies containing constraints and preferences), may be provided as necessary and/or desired.

Figure 4:
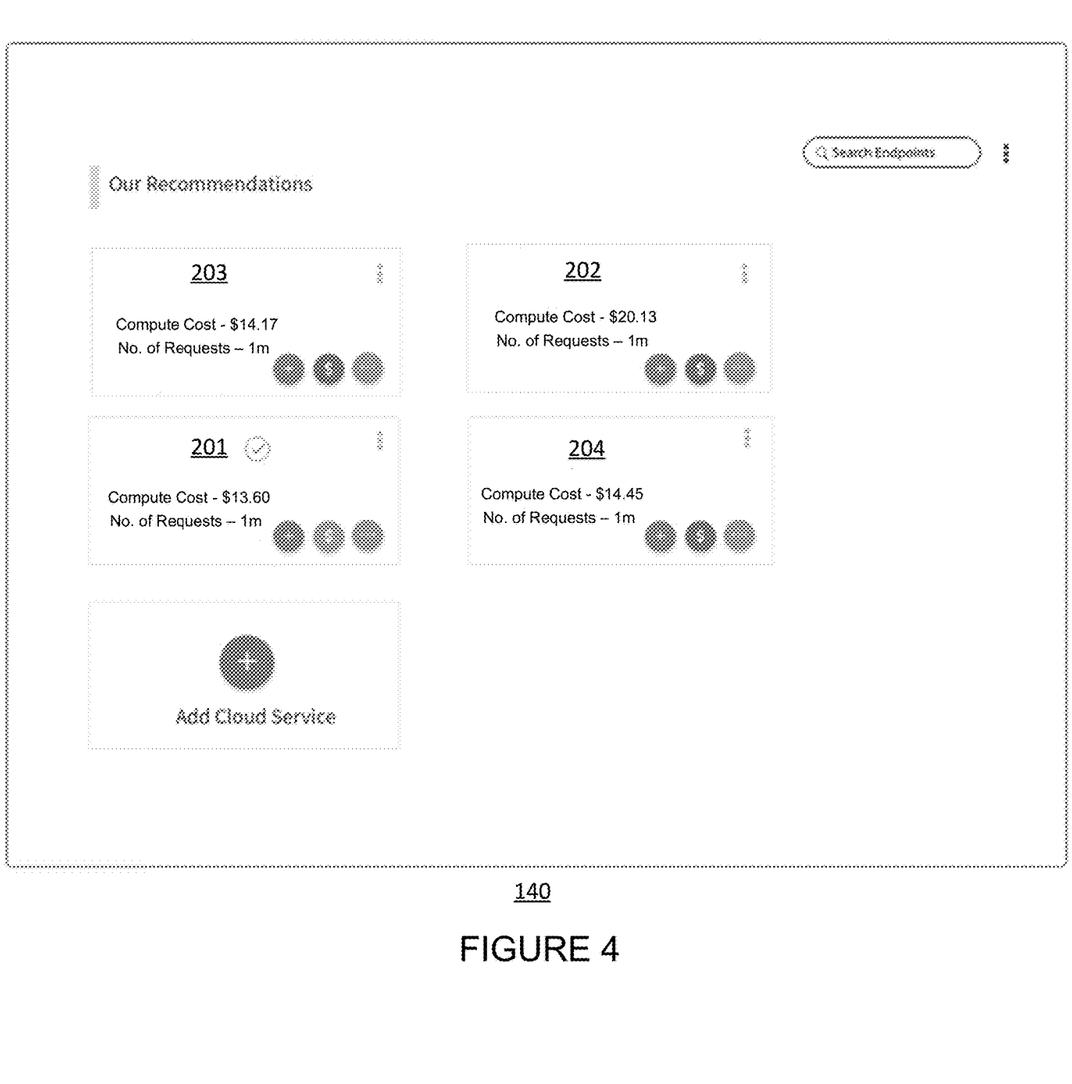
FIG. 4 illustrates another example embodiment of the user interface associated with the dashboard in FIG. 1.

FIG. 4 illustrates another example embodiment of the user interface associated with the dashboard in FIG. 1. In particular, the figure depicts the current cost per 1 MM executions for each FaaS platform for a specific function. Further, according to an embodiment, the FaaS gateway 110 may also (i) provide an amortized cost of 1 MM executions per cloud service vendor and (ii) inspect the algorithm per policies and business drivers to support a decision. Policies and business drivers will (i) have a relationship to pricing, (ii) have a peak or range of acceptable price points, (iii) allow for scheduling or executing the function, and (iv) provide service levels, compliance (e.g., PCI, SOC2), and security features (e.g., encryption) that a FaaS function or the FaaS platform service itself has dependencies on. Additionally, the user may choose to add a new "Cloud Service" FaaS endpoint to host a function as necessary and/or desired.

Figure 5:
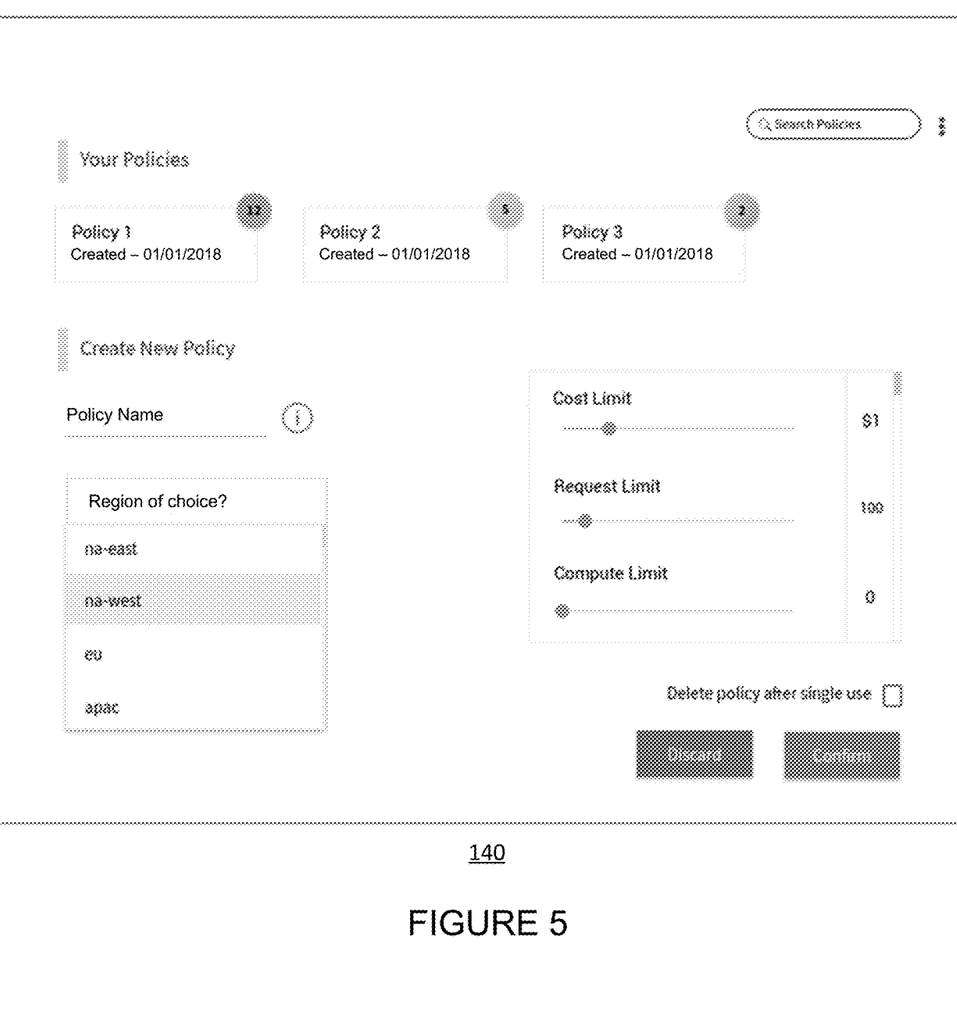
FIG. 5 illustrates another example embodiment of the user interface associated with the dashboard in FIG. 1.

FIG. 5 illustrates another example embodiment of the user interface associated with the dashboard in FIG. 1. In particular, the figure illustrates existing policies and corresponding number of associated functions. Further, according to an embodiment, the FaaS gateway 110 may also allow for the creation of a new policy, and selection of other criteria or limits (e.g., region preference, cost limit, request limit, compute limit, etc.) used by the decision engine to execute and route function execution.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for scheduling execution of function code between a plurality of cloud service platforms, the system comprising:
    one or more computing devices comprising a gateway, wherein the gateway includes at least one connector configured to receive incoming function code from an application that is registered with the gateway;
    a cloud service platform data aggregator, wherein the cloud service platform data aggregator is configured to receive service parameters from each of the plurality of cloud service platforms; and
    a metric scheduler, wherein the metric scheduler defines policies for routing the incoming function code to at least one of the plurality of cloud service platforms,
    wherein the gateway is configured to provide the incoming function code to one of the plurality of cloud service platforms for execution based on (i) the service parameters provided by each of the plurality of cloud service platforms and (ii) the policies provided by the metric scheduler,
    wherein a set of connectors are selected for the application in response to the application being registered with the gateway during a registration process, each connector in the set of connections corresponding to a distinct protocol.

2. The system of claim 1, further comprising:
    a graphical user interface, wherein the graphical user interface is configured to display at least one of the service parameters.

3. The system of claim 1, wherein the gateway triggers a function call to one of the plurality of cloud service platforms based on the incoming function code at the at least one connector.

4. The system of claim 3, wherein the function is called via one of a first calling mechanism and a second calling mechanism, wherein the first calling mechanism is associated with proprietary computing services and the second calling mechanism is associated with open source computing services.

5. The system of claim 1, wherein the aggregator is also configured to receive compliance and security information from each of the plurality of cloud service platforms.

6. The system of claim 1, wherein the gateway implements a routing algorithm in order to determine, for each of the plurality of cloud service platforms, (i) resources and time needed to execute a function associated with the function code, (ii) the language used for the function, and (iii) price offered by the cloud service platform for executing the function.

7. The system of claim 1, wherein the aggregator and the metric scheduler are implemented within the one or more computing devices.

8. The system of claim 1, wherein the service parameters received from each of the plurality of cloud service platforms comprise pricing data for each of the plurality of cloud service platforms.

9. The system of claim 8, wherein the gateway is configured to generate a graphical user interface (GUI), the GUI comprising a cost for the application, the cost being generated from the pricing data.

10. A method for scheduling execution of function code between a plurality of cloud service platforms, the method comprising:
   receiving, with a gateway, incoming function code from an application that is registered with the gateway;
   receiving, with a cloud service platform data aggregator, service parameters from each of the plurality of cloud service platforms; and
   routing, with the gateway, the incoming function code to one of the plurality of cloud service platforms for execution based on the service parameters provided by each of the plurality of cloud service platforms,
   wherein a set of connectors are selected for the application in response to the application being registered with the gateway during a registration process, each connector in the set of connections corresponding to a distinct protocol.

11. The method of claim 10, further comprising:
   displaying, with a graphical user interface, at least one of the service parameters.

12. The method of claim 10, further comprising:
   triggering, with the gateway, a function call of a function to one of the plurality of cloud service platforms based on the incoming function code.

13. The method of claim 12, wherein the function is called via one of a first calling mechanism and a second calling mechanism, wherein the first calling mechanism is associated with proprietary computing services of a first connector among the set of connectors and the second calling mechanism is associated with open source computing services of a second connector among the set of connectors.

14. The method of claim 10, further comprising:
   determining for each of the plurality of cloud service platforms, with the gateway, (i) resources and time needed to execute a function associated with the function code, (ii) the language used for the function, and (iii) price offered by the cloud service platform for executing the function.

15. The method of claim 10, wherein the gateway and the aggregator are implemented with one or more computing devices.

16. The method of claim 10, wherein the service parameters received from each of the plurality of cloud service platforms comprise pricing data for each of the plurality of cloud service platforms.

17. The method of claim 16, further comprising generating a graphical user interface (GUI), the GUI comprising a cost for the application, the cost being generated from the pricing data.

18. A system for scheduling execution of function code between a plurality of cloud service platforms, the system comprising:
   a first computing device, wherein the first computing device is configured to receive incoming function code from an application; and
   a second computing device, wherein the second computing device is configured to receive service parameters from each of the plurality of cloud service platforms,
   wherein the first computing device is configured to provide the incoming function code to one of the plurality of cloud service platforms for execution based on the service parameters provided by each of the plurality of cloud service platforms,
   wherein a set of connectors are selected for the application in response to the application being registered with the first computing device during a registration process, each connector in the set of connections corresponding to a distinct protocol.

\* \* \* \* \*